United States Patent
Nishio et al.

(10) Patent No.: US 8,035,571 B2
(45) Date of Patent: Oct. 11, 2011

(54) ANTENNA DEVICE AND SIGNAL RECEIVING METHOD

(75) Inventors: Masaki Nishio, Tokyo (JP); Takayoshi Ito, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 437 days.

(21) Appl. No.: 12/222,920

(22) Filed: Aug. 19, 2008

(65) Prior Publication Data
US 2009/0058758 A1    Mar. 5, 2009

(30) Foreign Application Priority Data
Aug. 29, 2007    (JP) .................................. 2007-223133

(51) Int. Cl.
*H01Q 11/00*    (2006.01)

(52) U.S. Cl. .................. 343/843; 343/793; 343/810

(58) Field of Classification Search .................. 343/767, 343/792.5, 753, 793, 745, 705, 859, 810, 343/850, 843, 708, 756; 342/373; 257/728; 324/326; 333/126, 318, 24 R; 340/572.7
See application file for complete search history.

(56) References Cited

U.S. PATENT DOCUMENTS

| | | | |
|---|---|---|---|
| 7,400,863 B2 * | 7/2008 | Kobayashi et al. | 455/78 |
| 2001/0035844 A1 * | 11/2001 | Reece et al. | 343/810 |
| 2002/0084942 A1 * | 7/2002 | Tsai et al. | 343/795 |
| 2002/0084943 A1 * | 7/2002 | Tsai et al. | 343/795 |
| 2004/0106381 A1 * | 6/2004 | Tiller | 455/73 |
| 2008/0278329 A1 * | 11/2008 | Kim et al. | 340/572.4 |
| 2009/0102706 A1 * | 4/2009 | Goldblatt et al. | 342/352 |

FOREIGN PATENT DOCUMENTS

| EP | 0 987 887 | 3/2000 |
|---|---|---|
| JP | 2001-028561 | 1/2001 |

* cited by examiner

*Primary Examiner* — Douglas W Owens
*Assistant Examiner* — Jae Kim
(74) *Attorney, Agent, or Firm* — Nixon & Vanderhye, P.C.

(57) ABSTRACT

An example antenna device includes a conductive ground plane and first and second antenna elements connected to the conductive ground plane through first and second feeding points, respectively. Directivities of the first and second antenna elements are arranged to be approximately perpendicular to each other. A phase adjusting circuit is configured to provide a phase difference of approximately 180 degrees between first and second received signals by the first and second antenna elements, respectively and a combining circuit is configured to combine the first and second received signals having a phase difference of approximately 180 degrees therebetween to obtain a combined signal. A radio unit is configured to process the combined signal.

8 Claims, 19 Drawing Sheets

(B) CASE SEEN FROM ONE OF ANTENNA FEEDING POINTS (A) CASE SEEN FROM NOISE SOURCE ON CONDUCTIVE GROUND PLANE

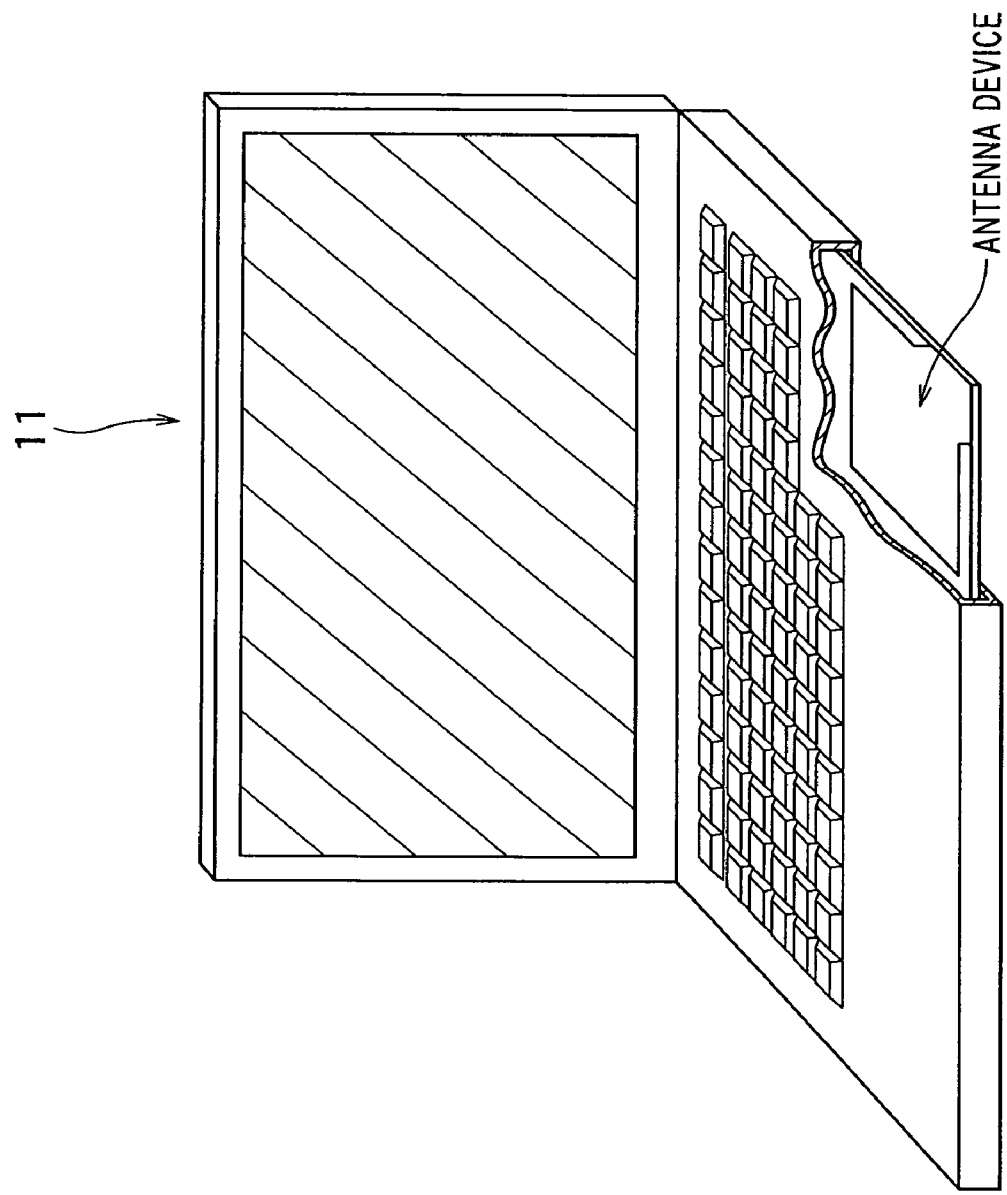

ANTENNA DEVICE AND SIGNAL RECEIVING METHOD

CROSS REFERENCE TO RELATED APPLICATIONS

This application is based upon and claims the benefit of priority from the prior Japanese Patent Applications No. 2007-223133, filed on Aug. 29, 2007; the entire contents of which are incorporated herein by reference.

BACKGROUND OF THE INVENTION

1. Field of the Invention

The present invention relates to, for example, an antenna device for a mobile communication terminal and a signal receiving method, and particularly to noise suppression techniques for an antenna.

2. Related Art

When a signal of digital terrestrial broadcasting, for example, is received with an antenna element contained in a mobile communication terminal such as a notebook personal computer (PC), noise produced in the terminal device itself may greatly affect reception characteristics of the antenna element. Some built-in, commercially available antenna devices for receiving digital terrestrial broadcasting have a low noise amplifier (LNA) inserted therein for compensating for a lowered gain due to the built-in structure. However, they suffer from a problem that the LNA also amplifies noise mixed with the signal and remain less effective. Further, an antenna element contained in a mobile communication terminal such as a notebook PC has problems of narrower bandwidth and lower gain of an antenna, for example.

As a technique for suppressing an undesired signal such as noise mixed therein, JP-A 2001-28561 (Kokai) describes providing a plurality of antenna elements, and using feedforward control through a multi-stage amplifying circuit and a phase circuit to cancel a signal received at each antenna element. However, this technique requires a plurality of amplifying circuits and phase circuits, and a circuit for controlling them, presenting a problem of a complex configuration.

SUMMARY OF THE INVENTION

According to an aspect of the present invention, an antenna device includes:

a conductive ground plane;

first and second antenna elements connected to the conductive ground plane through first and second feeding points, respectively, directivities of the first and second antenna elements being arranged to be approximately perpendicular to each other;

a phase adjusting circuit configured to provide a phase difference of approximately 180 degrees between first and second received signals by the first and second antenna elements, respectively;

a combining circuit configured to combine the first and second received signals having a phase difference of approximately 180 degrees therebetween to obtain a combined signal; and a radio unit configured to process the combined signal.

According to an aspect of the present invention, a signal receiving method includes:

receiving first and second signals by first and second antenna elements connected to a conductive ground plane through first and second feeding points, respectively, wherein directivities of the first and second antenna elements are arranged to be approximately perpendicular to each other;

creating a phase difference of approximately 180 degrees between first and second received signals;

combine the first and second received signals having the phase difference of approximately 180 degrees therebetween to obtain a combined signal; and processing the combined signal.

BRIEF DESCRIPTION OF THE DRAWINGS

FIG. 19 schematically shows a configuration in which the antenna device of an embodiment of the present invention is installed in a notebook PC.

DETAILED DESCRIPTION OF THE INVENTION

Now, embodiments will be hereinafter described in detail with reference to the accompanying drawings.

First Embodiment

Figure 1:
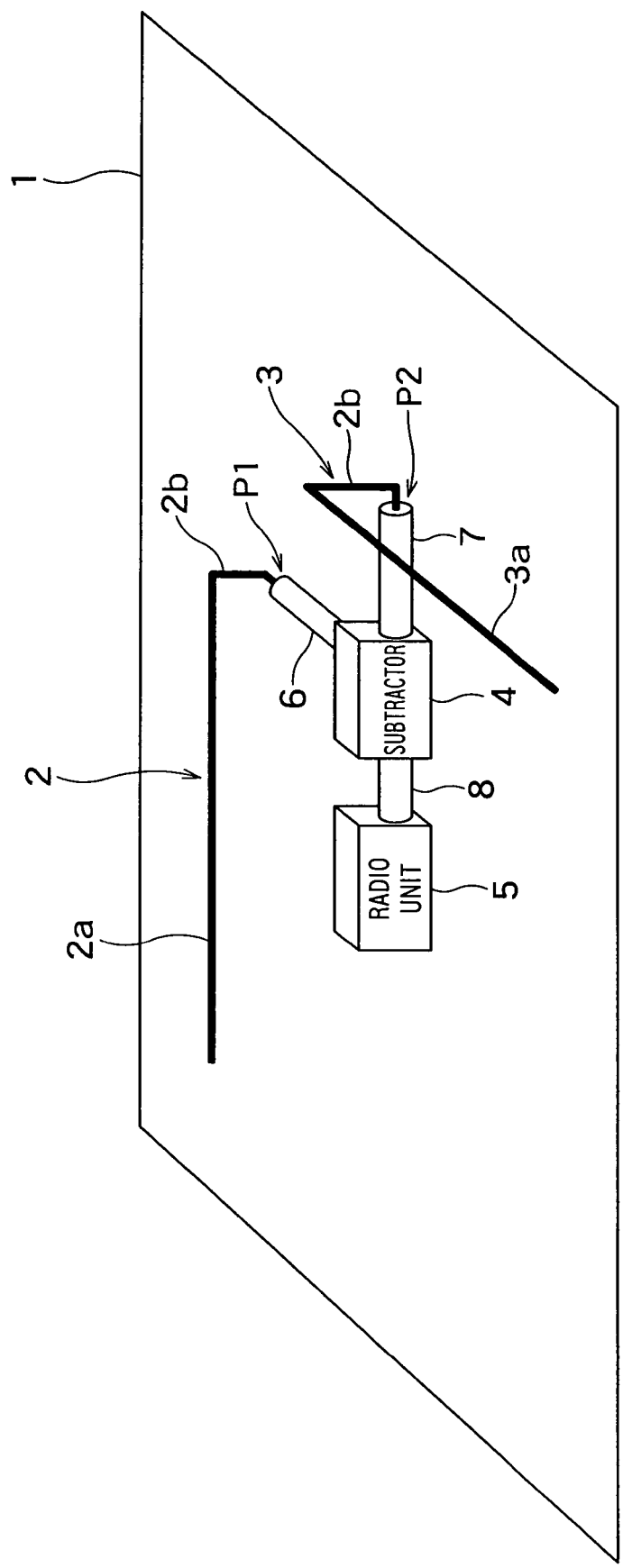
FIG. 1 schematically shows a configuration of an antenna device according to a first embodiment of the present invention.

FIG. 1 schematically shows a configuration of an antenna device according to a first embodiment of the present invention.

A first conductive element 2 having a near L-shape (antenna element) and a second conductive element 3 having a near L-shape (antenna element) for receiving, for example, a signal coming from a base station and the like are provided on a conductive ground plane 1 in a mobile communication terminal.

The antenna element 2 and the antenna element 3 are formed by bending a linear, conductive element into a near L-shape. The total lengths of the antenna element 2 and the antenna element 3 are approximately the same, and their length is approximately a quarter of an operating wavelength.

The antenna element 2 and the antenna element 3 have their one side (a first partial element) 2*a*, 3*a* arranged parallel to the conductive ground plane 1, and the other side (a second partial element) 2*b*, 3*b* arranged perpendicular to the conductive ground plane 1. Further, one side 2*a* of the antenna element 2 and one side 3*a* of the antenna element 3 are arranged to be kept perpendicular to each other (to form approximately 90 degrees between them in a plane). That is, the antenna element 2 and the antenna element 3 are arranged so that their radiation patterns are arranged approximately perpendicular to each other (to have different directivity). A tip end of the side 2*b* of the antenna element 2 and a tip end of the side 3*b* of the antenna element 3 are connected to feeding points P1 and P2 arranged on the conductive ground plane 1, respectively, and the feeding points P1 and P2 are adjacent to each other.

One end of feedlines 6 and 7 is connected to their feeding points P1 and P2, respectively, and the other ends are connected to a subtractor 4 (phase adjusting circuit). The feedlines 6 and 7 are, here, coaxial lines, and one end of internal conductors of the coaxial lines is connected to the feeding points P1 and P2, respectively, and the other ends of the internal conductors are connected to the subtractor 4, and external conductors are connected to the conductive ground plane 1.

At the feeding points P1 and P2, signals received at the antenna element 2 and the antenna element 3 are taken out, and output to the feedlines 6 and 7. Here, on receiving the signals, the feeding points P1 and P2 may be subject to a noise signal carried across the conductive ground plane 1 from a noise source (not shown) such as other circuits on the conductive ground plane 1. A signal on the feeding point P1, which is the signal received at the antenna element 2 mixed with the noise signal, is input to the subtractor 4 through the feedline 6. Further, a signal on the feeding point P2, which is the signal received at the antenna element 3 mixed with the noise signal is also input to the subtractor 4 through the feedline 7.

The subtractor 4 (phase adjusting circuit) shifts a phase of one of the signals input from the feedlines 6 and 7 by approximately 180 degrees, combines them, and inputs the combined signal to one end of a line 8 such as a microstrip line and a coaxial line. The other end of the line 8 is connected to a radio unit 5, and the signal input to one end is transferred to the radio unit 5.

The subtractor 4 includes, for example: a phase shifting circuit for creating a phase difference of approximately 180 degrees between the signals input from the feedlines 6 and 7; and a combining point at which the phase-adjusted signals are combined. The phase shifting circuit may be built with, for example, an inductor and a capacitor, or may be formed of delay lines for varying two signal line lengths so as to generate the phase difference of approximately 180 degrees between two signals.

The feeding points P1 and P2, as described above, are here arranged adjacent to each other on the conductive ground plane 1. Accordingly, the noise signals on the feeding points P1 and P2 have approximately the same phase. Then, the subtractor 4 shifts, by approximately 180 degrees, the phase of one of the signals input from the feeding points P1 and P2 through the feedlines 6 and 7 and combines them (that is, subtraction), so that the noises mixed in at the feeding points P1 and P2 cancel each other, thereby largely suppressing the noises mixed into the received signals. In order that the noises, here, may effectively cancel each other, a distance between the feeding points P1 and P2 is desirably equal to or smaller than a quarter of a wavelength. This is because the noises received at both antenna elements are brought into the destructive relation of their phases at the distance between the feeding points equal to or larger than a quarter of the wavelength, and the noises will be strengthened each other and will not be suppressed when combined in the subtractor 4.

In addition to the efficient noise suppression described above, radiation patterns of the antenna element 2 and the antenna element 3 are approximately perpendicular to each other, as described above, and therefore an incoming electric wave received at each of the antenna elements 2 and 3 largely differs in level when a radio signal is received from a certain direction. That is, the radio signal coming from a certain direction will be received at either one of the antenna elements 2 and 3 in a high level, and at the other of the antenna elements in a low level. Accordingly, even when the signals received at the antenna elements 2 and 3 are shifted in phase by 180 degrees and combined by the subtractor 4, effects on the incoming radio signal will be negligible. That is, processing by the subtractor 4 suppresses the noises mixed in from the noise source on the conductive ground plane, while losses in the incoming radio signal are negligible for demodulation.

Figure 2:
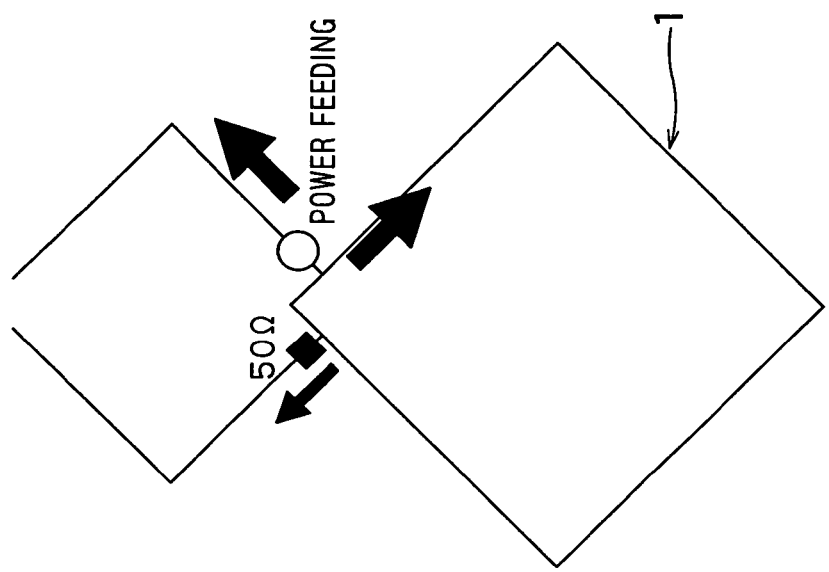
FIG. 2 illustrates the principle of operation of the antenna device in FIG. 1.
Figure 2:
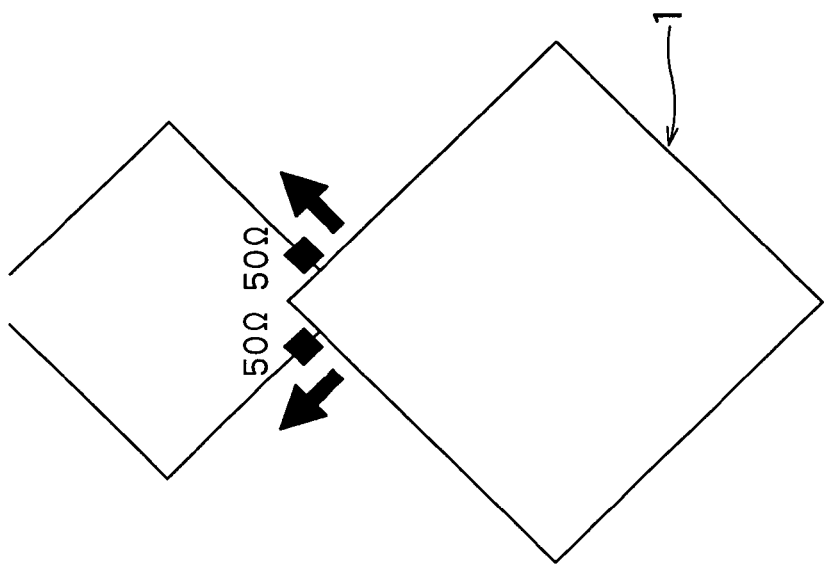

To consider the principle of operation of the present antenna device, FIG. 2 schematically shows the relation between the antenna elements and the conductive plane. As shown in FIG. 2(A), seen from the noise source on the conductive ground plane, both antenna elements appear to have a respective line of 50Ω connected thereto in the case where characteristic impedance of the feedline is 50Ω. That is, because, seen from the noise signals on the feeding points P1 and P2, the antenna elements may appear to be similar, and electric current having the same amplitude tends to flow through both antenna elements. Further, as shown in FIG. 2(B), when one of the antenna elements is powered (when one of the antenna elements receives a signal), the other antenna element may appear as a line of 50Ω, that is, high impedance, and the supplied electric current tends to flow through one of the antenna elements and the substrate (see the thick arrows in FIG. 2(B)). That is, the signal on one of the antenna elements does not easily flow into the other antenna element. Consequently, arranging two antenna elements to keep them perpendicular to each other allows electric current flowing upon powering each antenna element to be perpendicular to each other, and radio patterns of the antenna elements to be perpendicular to each other. Accordingly, when an electric wave coming from a certain direction is received, the incoming electric wave is received at the antenna elements in a different level (electric current differs in amplitude level between the antenna elements), so that even when the respective received signals on each of the antenna elements flow into and are combined in the subtractor 4, the combined signal maintains characteristics of the signal of the incoming electric wave, presenting no problem. From the above reason, it becomes possible to appropriately receive the signal of the incoming electric wave while suppressing the noise signal.

The noise-suppressed received signal (combined signal) obtained from the subtractor 4 is transferred to the radio unit 5 through the line 8, and the radio unit 5 processes the received signal (combined signal) input from the subtractor 4 for reception (for example, amplifying, limiting a bandwidth, demodulating, and decoding).

As described above, according to the present embodiment, the signals received at each antenna element are processed to have a phase difference of approximately 180 degrees, and combined, which processing can efficiently and easily remove the noise mixed into the received signal.

Second Embodiment

Figure 3:
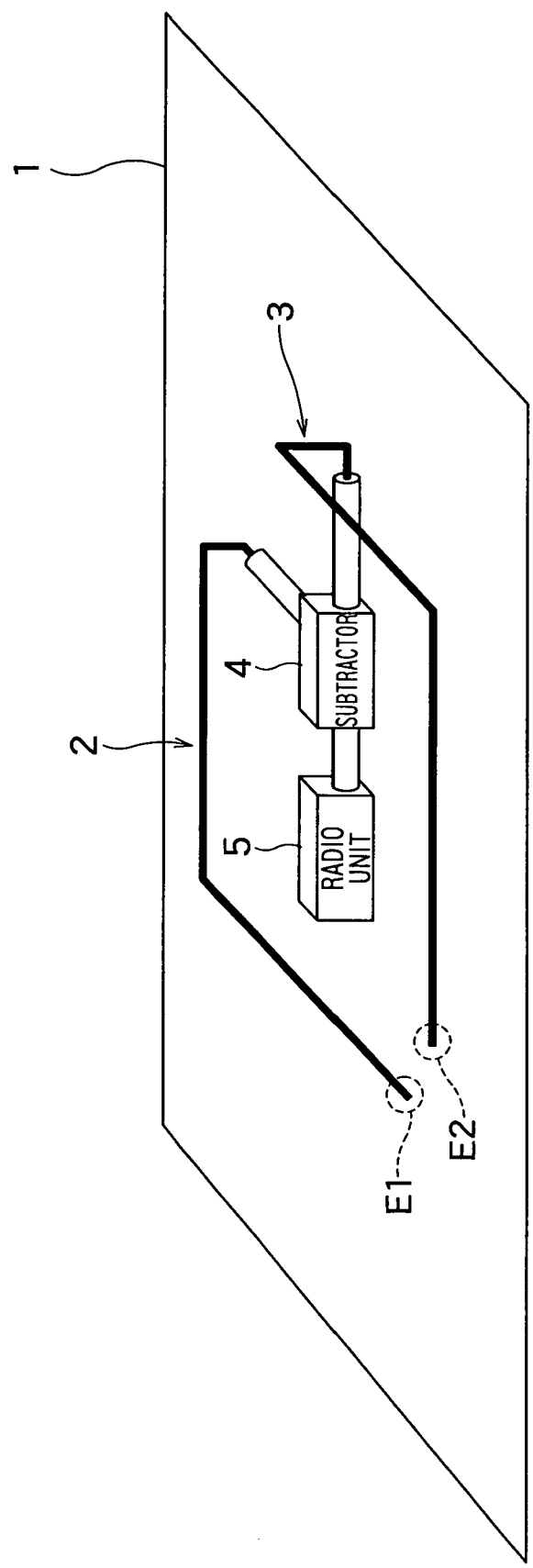
FIG. 3 schematically shows a configuration of an antenna device according to a second embodiment of the present invention.

FIG. 3 schematically shows a configuration of an antenna device according to a second embodiment of the present invention.

The second embodiment is configured so that, in the antenna device in FIG. 1 sides 2a and 3a of the antenna elements 2 and 3 are angled parallel to the conductive ground plane 1, respectively, and open ends (tip ends) E1 and E2 of the angled sides 2a and 3a are positioned adjacent to each other.

The tip ends E1 and E2 of the antenna elements 2 and 3 are made adjacent to each other, so that capacitive coupling between the antenna elements 2 and 3 is strengthened. Accordingly, even if noise enters the feeding points P1 and P2 with a different amount (amplitude) from a noise source on the conductive ground plane 1, the antenna elements 2 and 3 have a noise amplitude in approximately the same level, improving a noise suppression effect on subtraction by the subtractor 4. A distance between the open ends E1 and E2 is desirably equal to or smaller than 0.015 of a wavelength, and in this case, the effect described above can be more improved.

Further, when the coupling between the tip ends E1 and E2 is strengthened in this way, one of the antenna elements also has high impedance while the other of the antenna elements is used for reception, and accordingly, electric current distributions are perpendicular to each other, and radiation patterns are perpendicular to each other. Consequently, it is possible to correctly receive an incoming electric wave signal while satisfactorily suppressing a noise in the subtractor 4.

Here, the antenna elements 2 and 3 may preferably have a length of approximately a quarter of an operating wavelength, respectively. In this case, there is an advantage of easy matching between the antenna elements and the feedlines.

Third Embodiment

Figure 4:
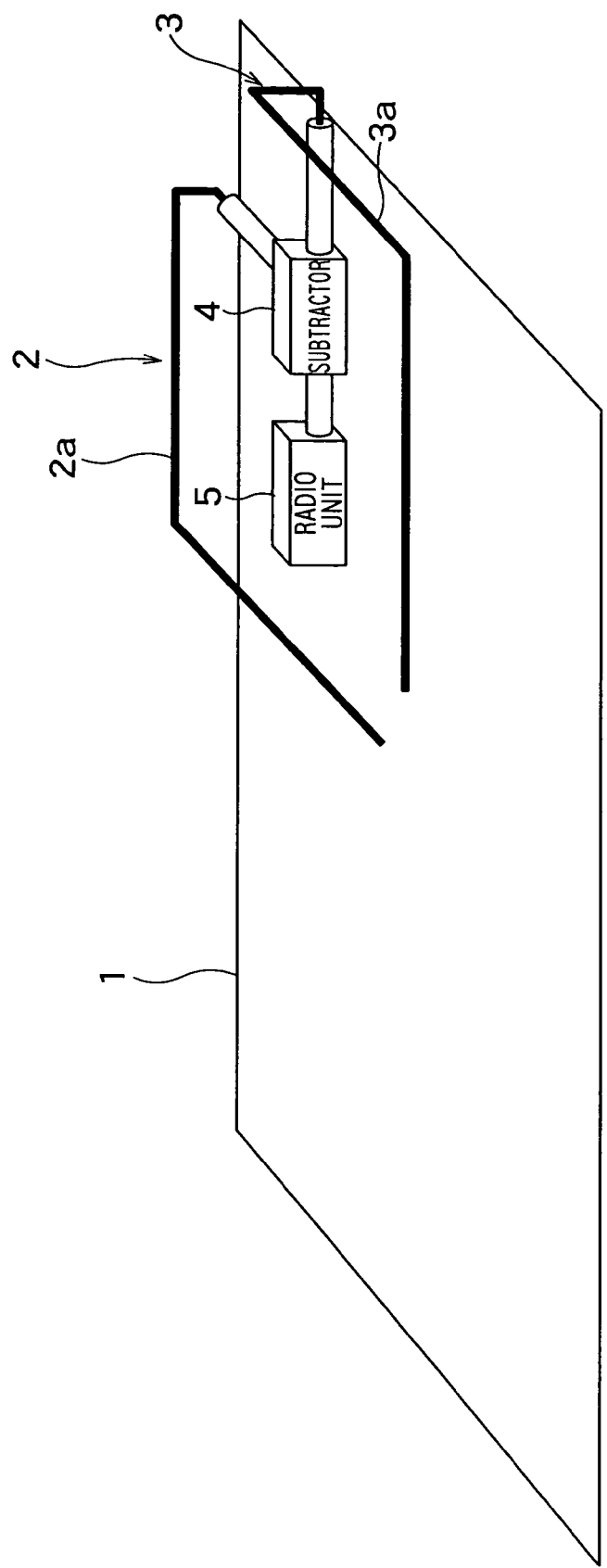
FIG. 4 schematically shows a configuration of an antenna device according to a third embodiment of the present invention.

FIG. 4 schematically shows a configuration of an antenna device according to a third embodiment of the present invention.

The third embodiment is configured so that the antenna device in FIG. 3 (a portion except for the conductive ground plane) is moved to a corner portion of the conductive ground plane 1. Portions 2a and 2b of the antenna elements 2 and 3 are arranged along edge sides of the conductive ground plane 1 where electric current easily flows. In such a configuration, electric current concentrates on the antenna elements and end portions of the conductive ground plane, enhancing orthogonality between both antenna elements.

Simulation

Now, the result will be shown that has been obtained through simulation for confirming characteristics of the antenna device shown in FIG. 4 by the present inventors. In this case, for parameters in the simulation, a size of the conductive ground plane was 280 mm×210 mm, and a length of the antenna elements was 145 mm. Further, the distance between the feeding points was 85 mm, and the distance between the open ends was 7 mm.

Figure 5:
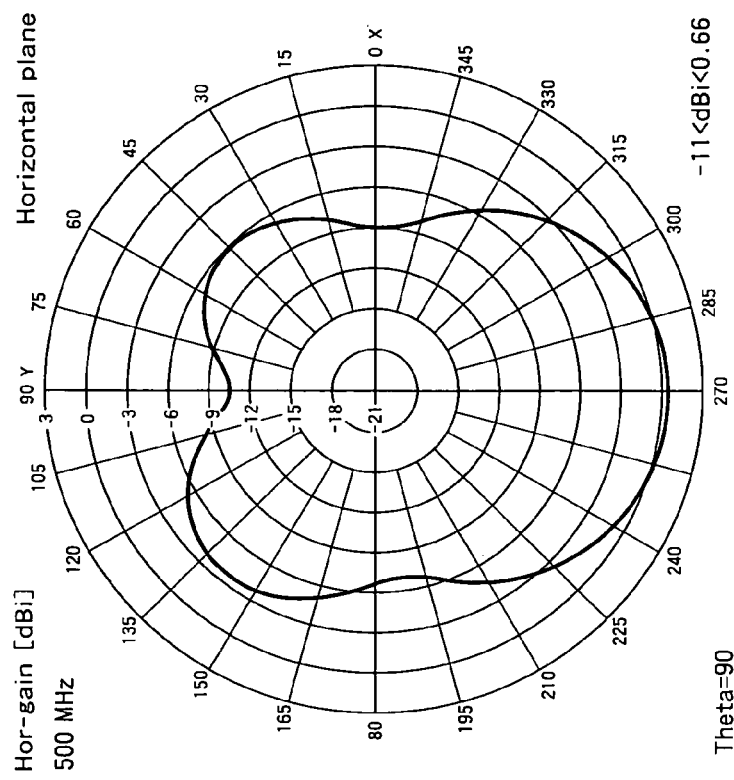
FIG. 5 shows a radiation pattern of the antenna device shown in FIG. 4, obtained through simulation.
Figure 5:
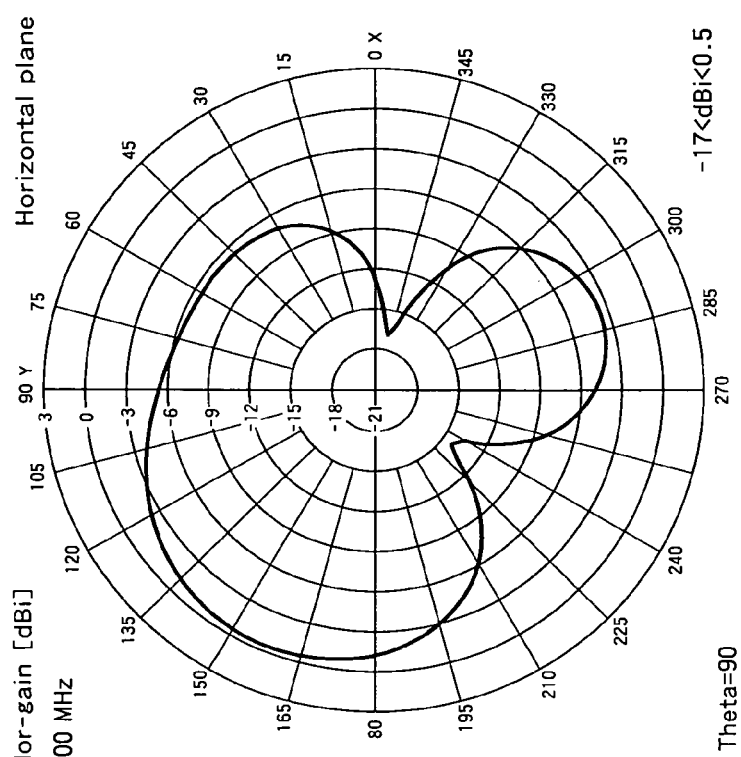

FIG. 5 shows radiation patterns (received patterns) of a horizontal polarized wave in a horizontal plane of two antennas, obtained through the simulation. As being seen from FIG. 5, it will be understood that the radiation patterns (directivity) of the antenna elements 2 and 3 largely differ, and are approximately perpendicular to each other.

Figure 6:
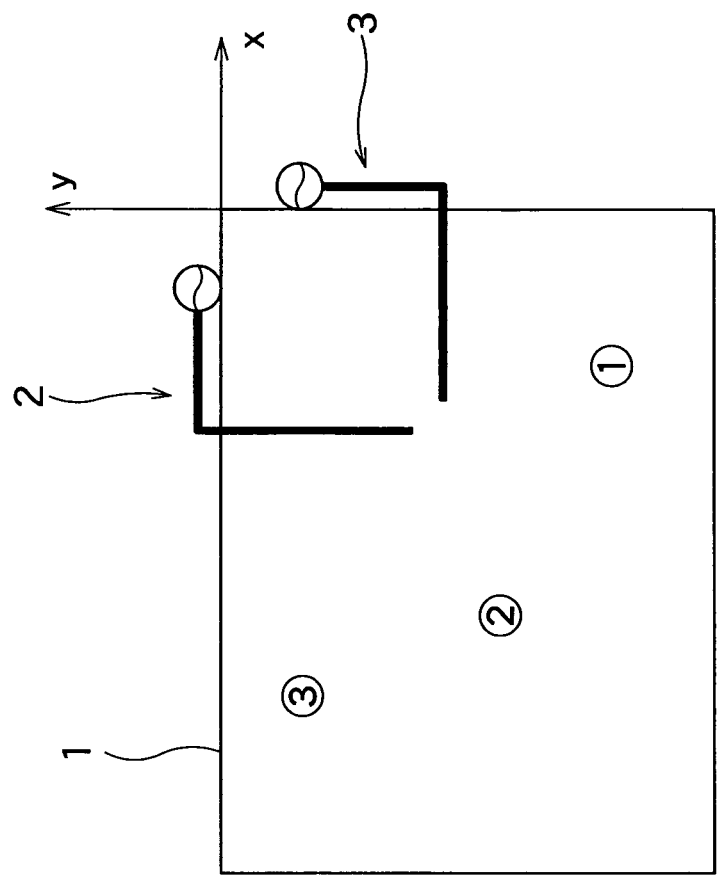
FIG. 6 shows an amount of noise suppressed by the antenna device shown in FIG. 4, obtained through simulation.

FIG. 6 shows an amount of noise suppressed by the antenna device at each position when a corner portion adjacent to two feeding points on the conductive ground plane is taken as the original point in the X-Y coordinate system, and positions of the noise source are (−40, −160), (−180, −140), and (−200, −40). As can be seen in FIG. 6, it may be confirmed that, independent of the positions of the noise source, the noise is largely suppressed.

Fourth Embodiment

Figure 7:
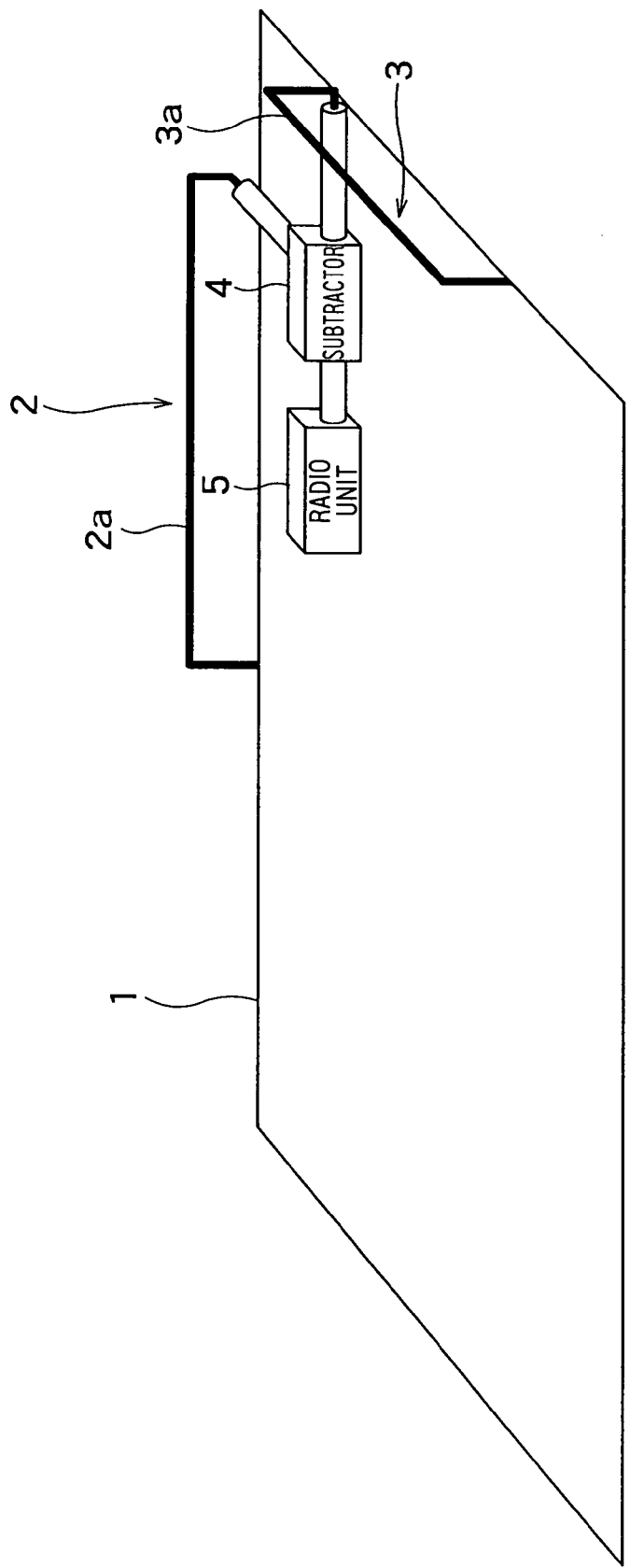
FIG. 7 schematically shows a configuration of an antenna device according to a fourth embodiment of the present invention.

FIG. 7 schematically shows a configuration of an antenna device according to a fourth embodiment of the present invention.

The fourth embodiment is configured so that the antenna device shown in FIG. 1 (a portion except for the conductive ground plane) is moved to an end portion of the conductive ground plane, and sides 2a and 3a of the antenna elements 2 and 3 are angled toward the side of the conductive ground plane 1, and tip ends thereof are short-circuited to the conductive ground plane 1. The tip ends short-circuited to the conductive ground plane 1 allows an electric current distribution on the conductive ground plane 1 to be concentrated on a portion immediately below the relevant antenna element on reception at the antenna element, and accordingly orthogonality of the electric current distribution is improved, and orthogonality of the radiation patterns are enhanced, thereby enhancing improvement of SIR. At this time, because the antenna elements 2 and 3 are positioned along the edge sides of the conductive ground plane 1, this effect is more increased. The antenna elements 2 and 3 may preferably have, for example, a length of approximately a half of an operating wavelength. In this case, there is an advantage of easy matching between the antenna elements and the feedlines.

Fifth Embodiment

Figure 8:
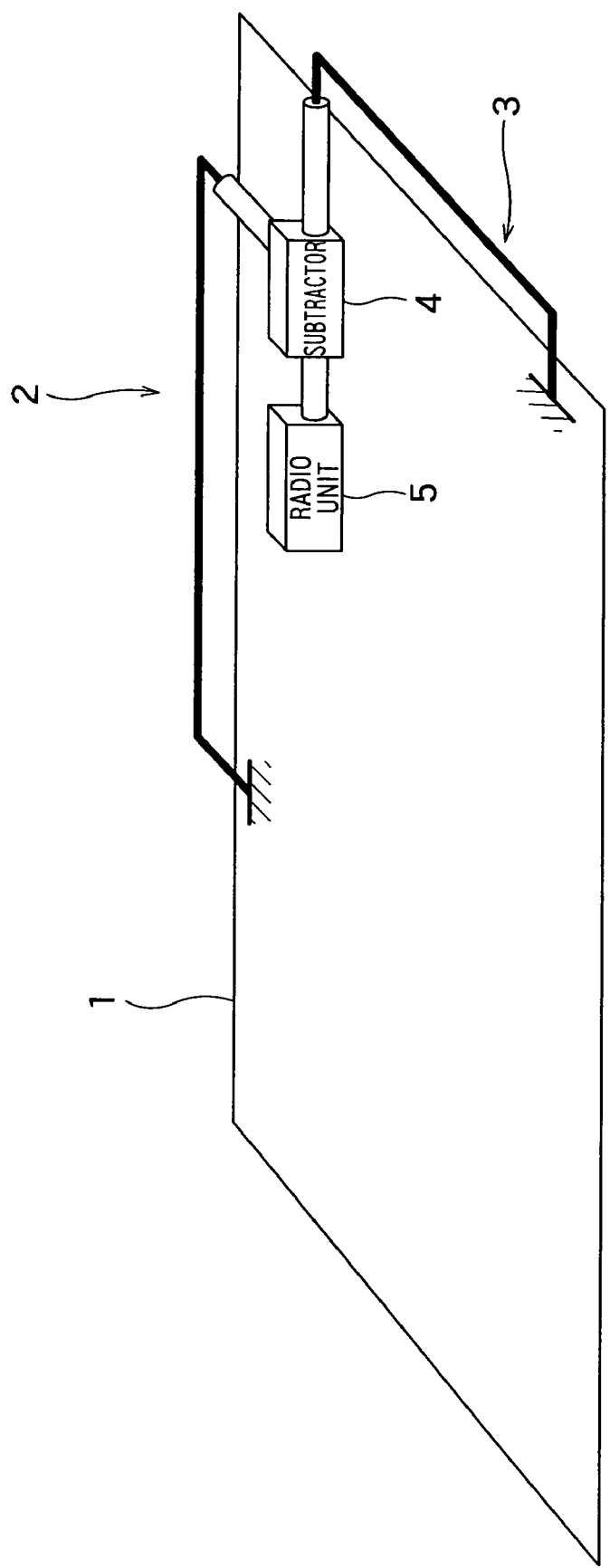
FIG. 8 schematically shows a configuration of an antenna device in which the antenna elements in FIG. 7 are disposed coplanar with a conductive ground plane.

FIG. 8 schematically shows a configuration of an antenna device according to a fifth embodiment of the present invention.

In the fifth embodiment, the antenna elements are arranged so that a plane on which the antenna elements exist in the antenna device in FIG. 7 is parallel to the conductive ground plane 1, and the antenna elements are positioned so that the antenna elements are flush with the conductive ground plane 1.

The antenna elements flush with the conductive ground plane 1 facilitate installation of the antenna elements and provide for a low profiled antenna device. For a specific configuration, for example, a metal layer is formed on a dielectric plate, and a part of the metal layer is used to form the conductive ground plane 1, the lines, and feedlines (for example, a microstrip line), and the remaining area is, for example, patterned to form the antenna elements, and thereby it is possible to easily build the conductive ground plane and the antenna elements which are located on the same plane.

Further, the antenna elements may be located higher than the conductive ground plane 1, which also provides for a low profiled antenna device. In this case, the tip ends of the antenna elements may be connected to the conductive ground plane 1 by, for example, soldering.

Variations

Figure 9:
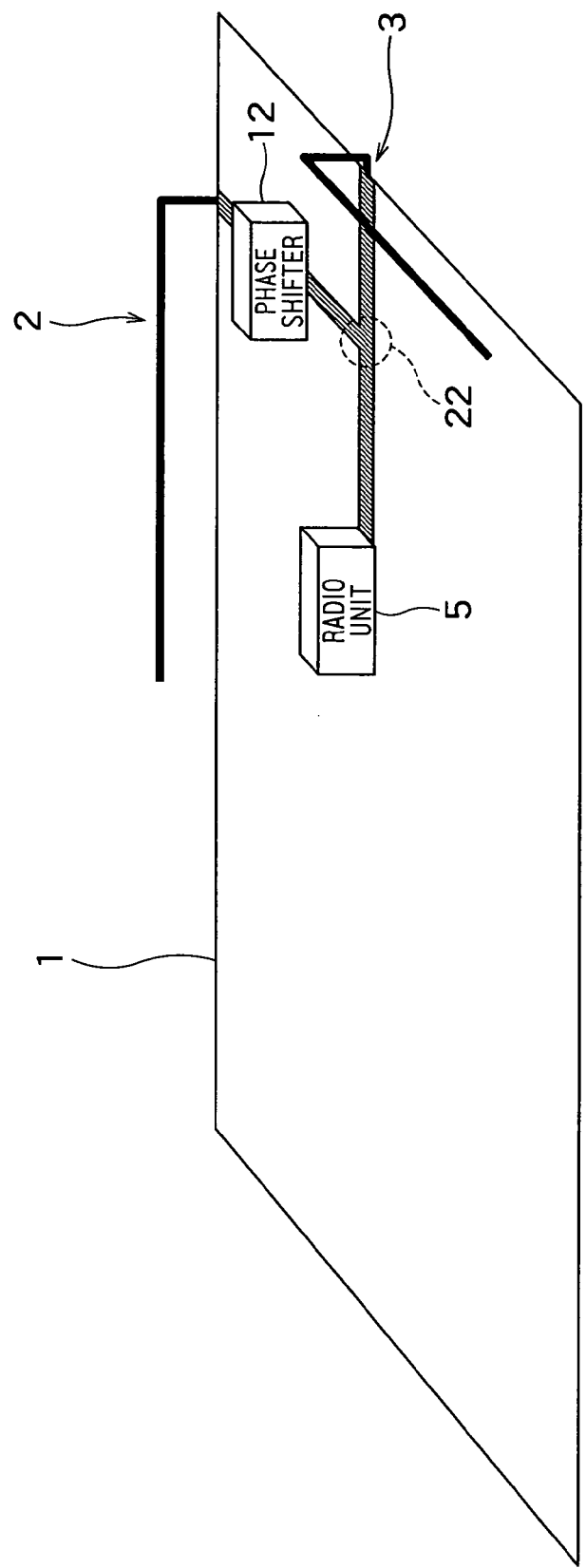
FIG. 9 schematically shows a configuration of an antenna device in which a feedline of the antenna device shown in FIG. 4 is a microstrip line, and a subtractor in FIG. 4 is formed of a phase shifter and a combining point.

FIG. 9 shows a variation of the antenna device shown in FIG. 4.

In FIG. 4, the line 8 and the feedlines 6 and 7 are coaxial lines, while in the present embodiment, they are microstrip lines. In such a manner, the present invention has no limit to a line configuration, and a line with another configuration may also be used, in addition to the coaxial line and the microstrip line.

Further, in the present embodiment, as the subtractor 4, a phase shifter 12 is provided in the feedline 6, and the signal of one of the feedlines is given a phase delay of approximately 180 degrees. The other ends of two feedlines are connected together at a combining point 22, and at the combining point 22, the signals from the two feedlines, which have a phase difference of approximately 180 degrees, are combined with each other. The combined signal obtained at the combining point 22 is input to the radio unit 5 through the line.

Figure 10:
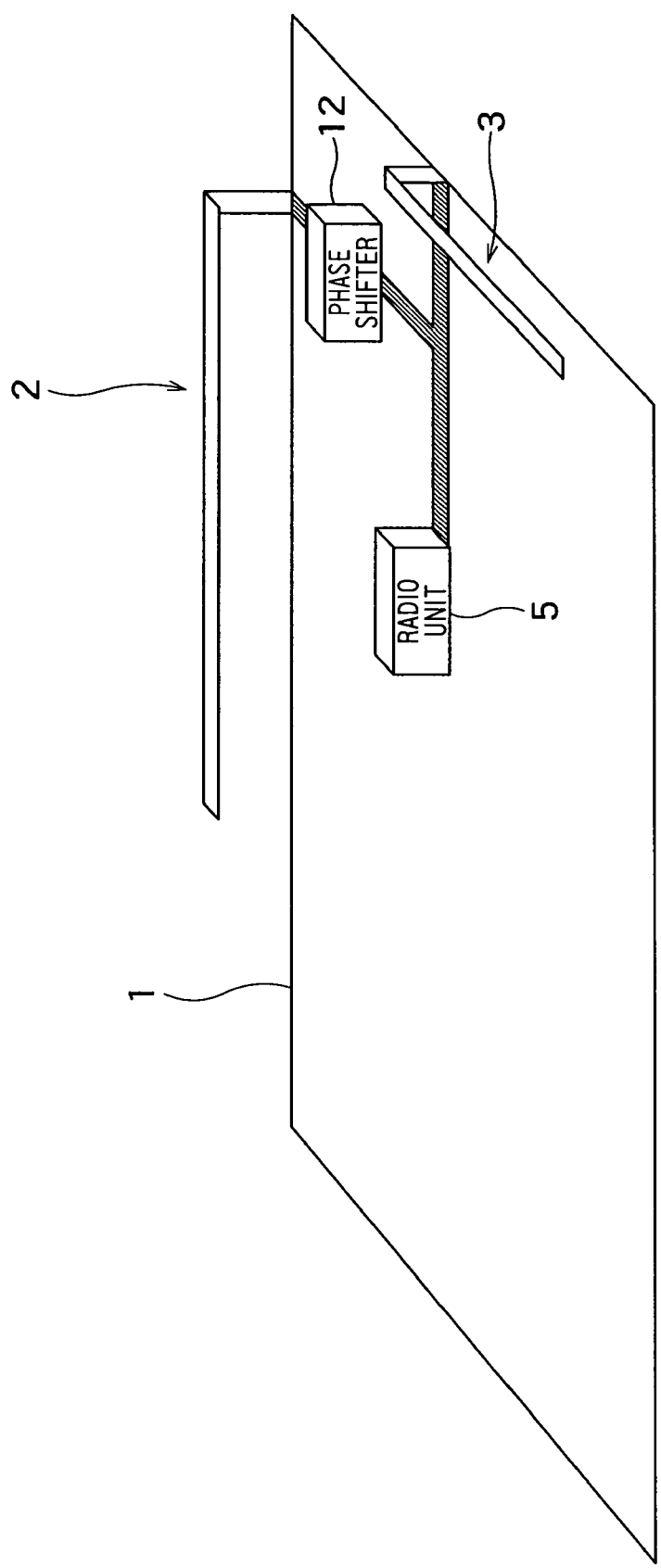
FIG. 10 schematically shows a configuration of an antenna device in which the antenna elements of the antenna device shown in FIG. 9 are changed to have the form of a plate.

FIG. 10 shows a variation of the antenna device shown in FIG. 9. In the antenna device in FIG. 9, two antenna elements have been in the form of a line, while as shown in FIG. 10, two antenna elements may be in the form of a plate. Being in the form of a plate, the antenna element can have a wider bandwidth.

Figure 11:
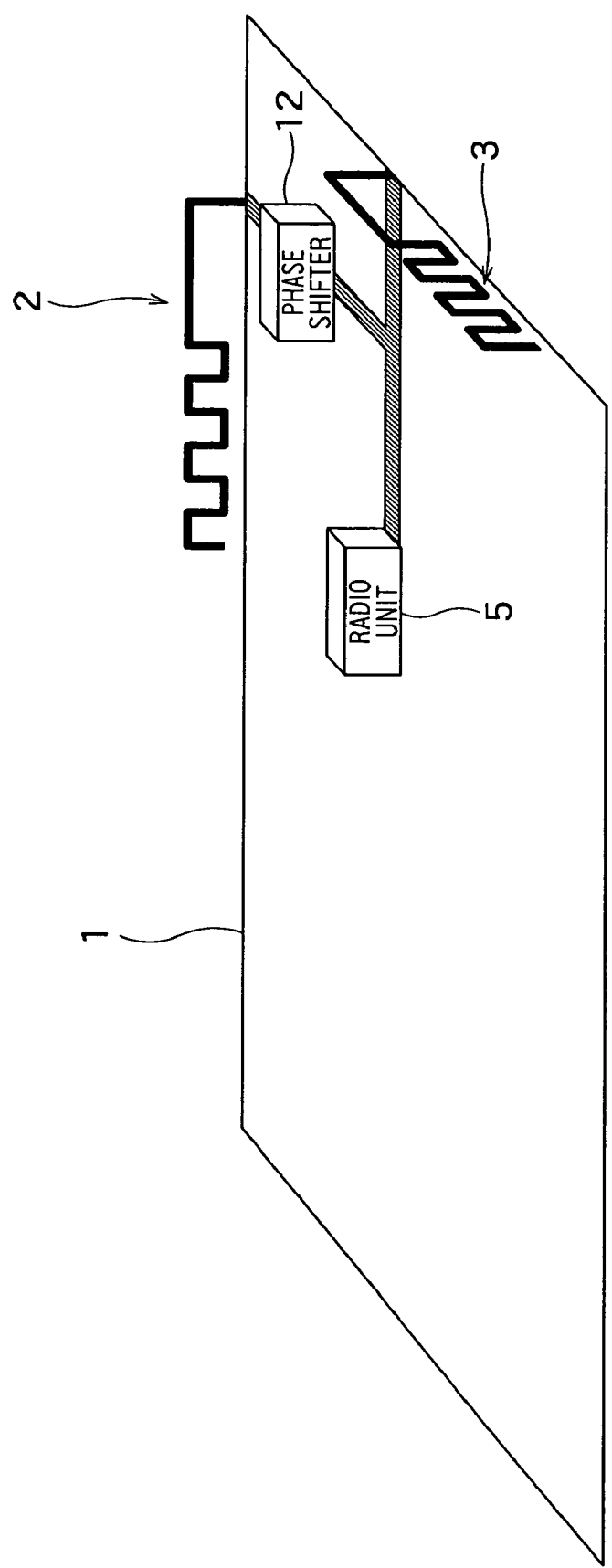
FIG. 11 schematically shows a configuration of an antenna device in which the antenna elements of the antenna device shown in FIG. 9 are changed to have a meander shape.

FIG. 11 shows a variation of the antenna device shown in FIG. 9. As shown in FIG. 11, two antenna elements may have a meandering shape. Having the meandering shape, the antenna elements can be formed smaller.

Figure 12:
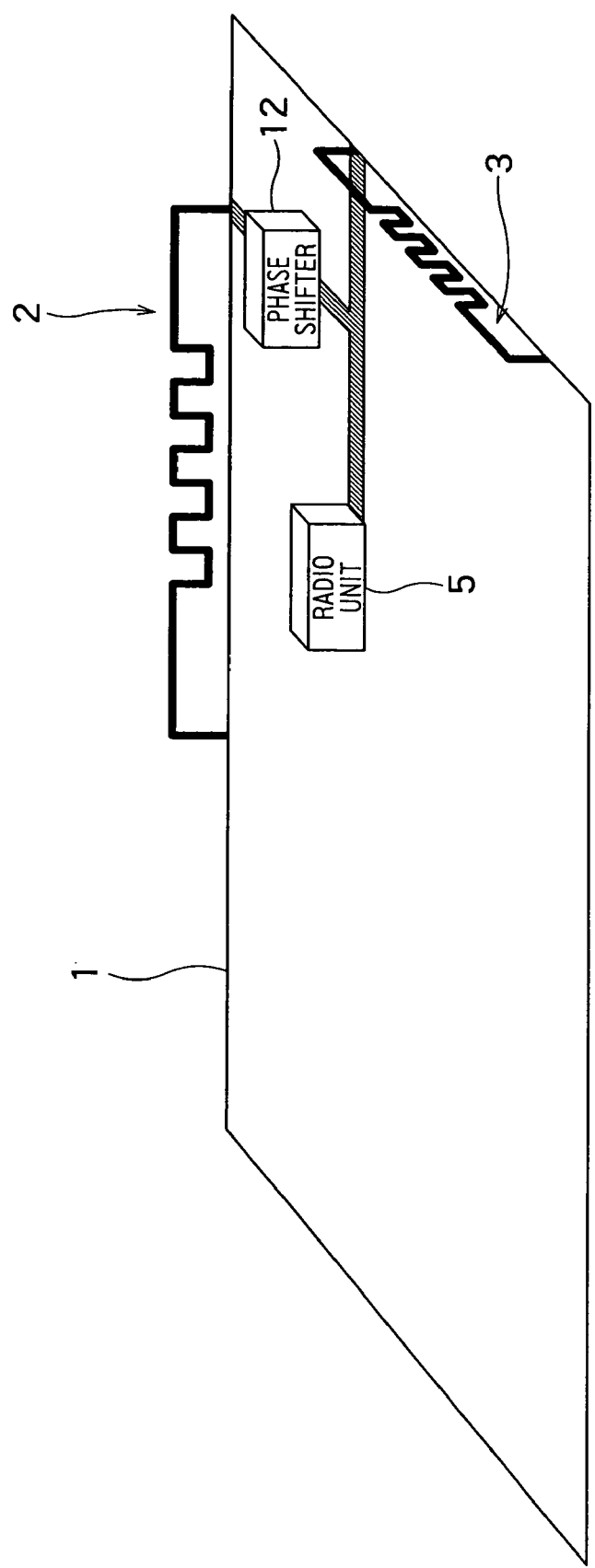
FIG. 12 schematically shows a configuration of an antenna device in which tip ends of the antenna elements of the antenna device shown in FIG. 11 are connected to the conductive ground plane.

FIG. 12 shows a variation of the antenna device shown in FIG. 11. As shown in FIG. 12, tip ends of two antenna elements having the meandering shape may be short-circuited to the conductive ground plane 1. Consequently, there may be the effect similar to the antenna device described referring to FIG. 7.

Figure 13:
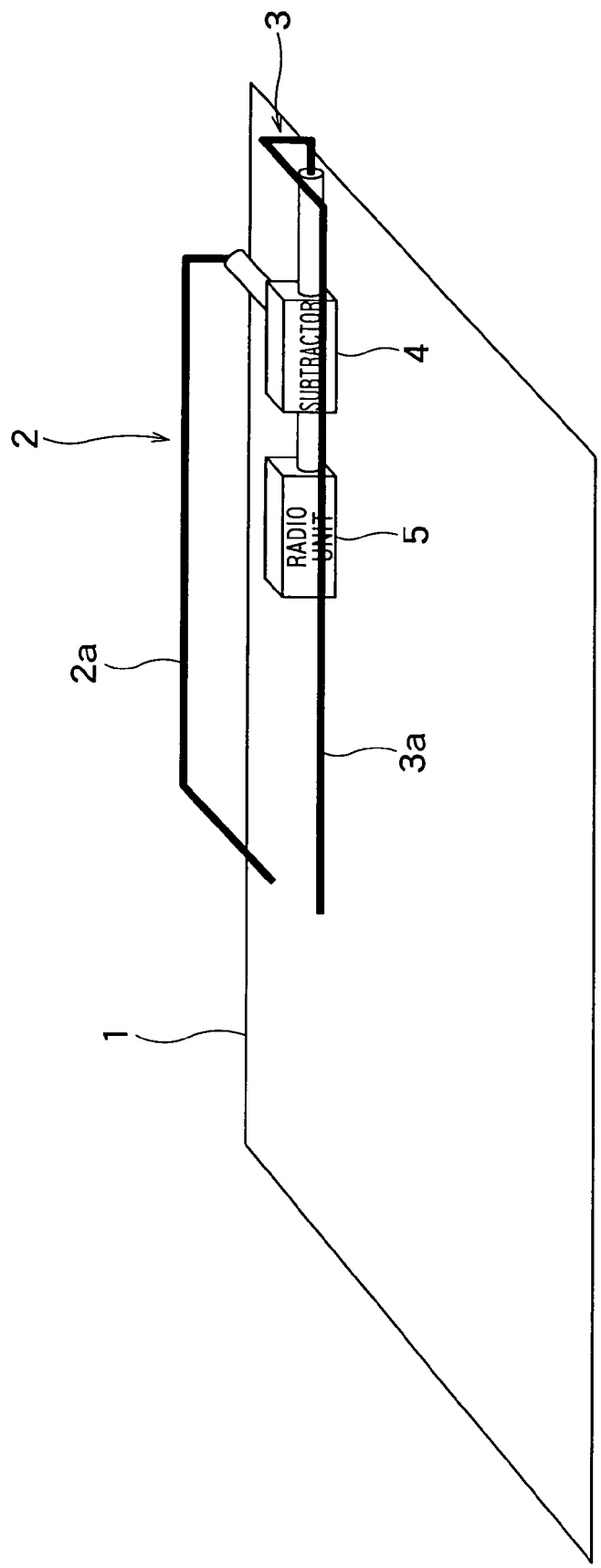
FIG. 13 schematically shows a configuration of an antenna device in which two antenna elements of the antenna device shown in FIG. 4 have an unsymmetrical shape.

FIG. 13 shows a variation of the antenna device shown in FIG. 4. In the antenna device in FIG. 4, the side 2a of the antenna element 2 has been angled at approximately the same position as that at which the side 3a of the antenna element 3 has been angled, while in the present embodiment, as shown in FIG. 13, they are angled at a different position, respectively. Describing from another viewpoint, in FIG. 4, the side 2a and the side 3a have been symmetrical with respect to a line connecting the center of a line segment connecting respective open ends (tip ends) and the center of a line segment connecting the other, respective sides (connection points to the side 2b and the side 3b), while in the present embodiment, the side 2a and the side 3a are not symmetrical with respect to the relevant line. Because the effect of the present invention is not damaged even if unsymmetrical, a degree of freedom may be enhanced on implementing the antenna device.

Figure 14:
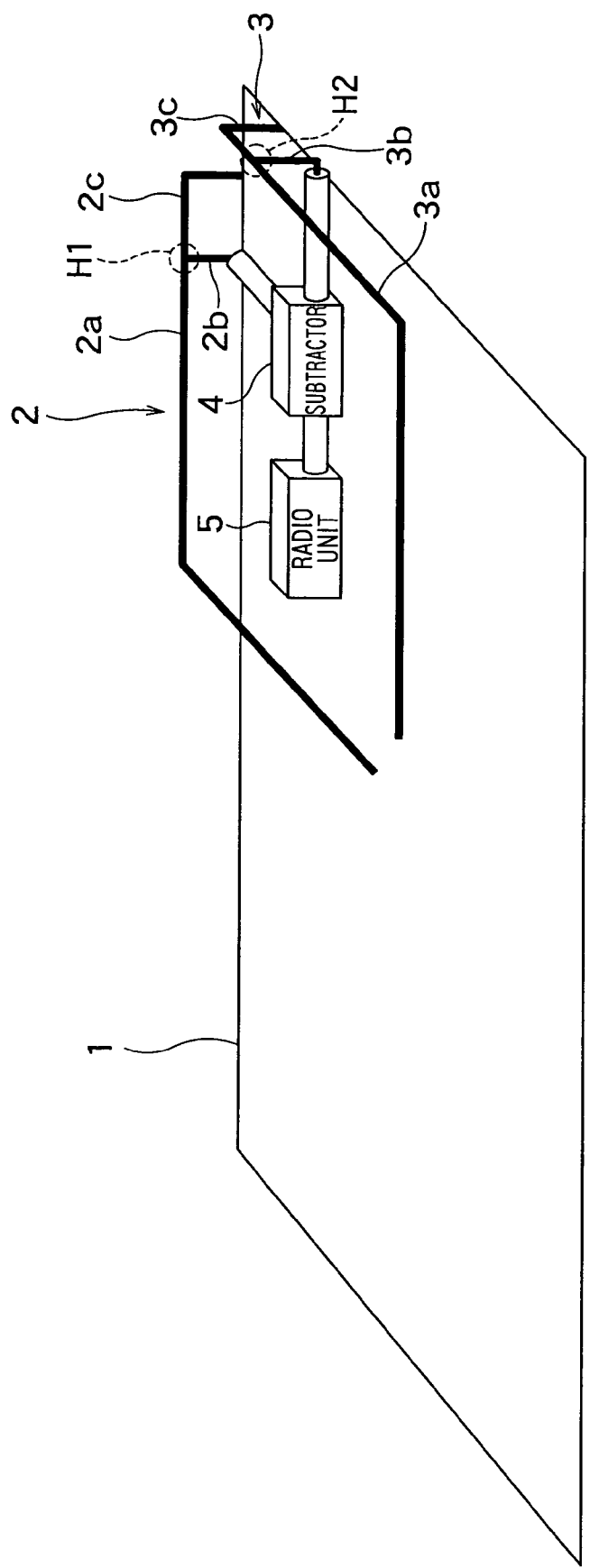
FIG. 14 schematically shows a configuration of an antenna device in which the antenna elements of the antenna device shown in FIG. 4 are inverted F antenna elements.

FIG. 14 shows a variation of the antenna device shown in FIG. 4. In the antenna device of FIG. 4, two antenna elements have had an L-shape (the sides 2a and 3a have been angled), while as shown in FIG. 14, two antenna elements may have a shape of an inverted F antenna (the sides 2a and 3a are angled). Having the shape of an inverted F antenna, there is an advantage of easy matching between the antenna elements and the feedlines. In addition, in the inverted F antenna, as shown in FIG. 14, a conductive element 2c extends from an intersection point H1 of the side 2a and the side 2b parallel to the conductive ground plane 1, and is angled toward the side of the conductive ground plane 1 on the way to be short-circuited to the conductive ground plane 1. Similarly, a conductive element 3c extends from an intersection point H2 of the side 3a and the side 3b parallel to the conductive ground plane 1, and is, on the way, angled toward the side of the conductive ground plane 1 to be short-circuited to the conductive ground plane 1.

Figure 15:
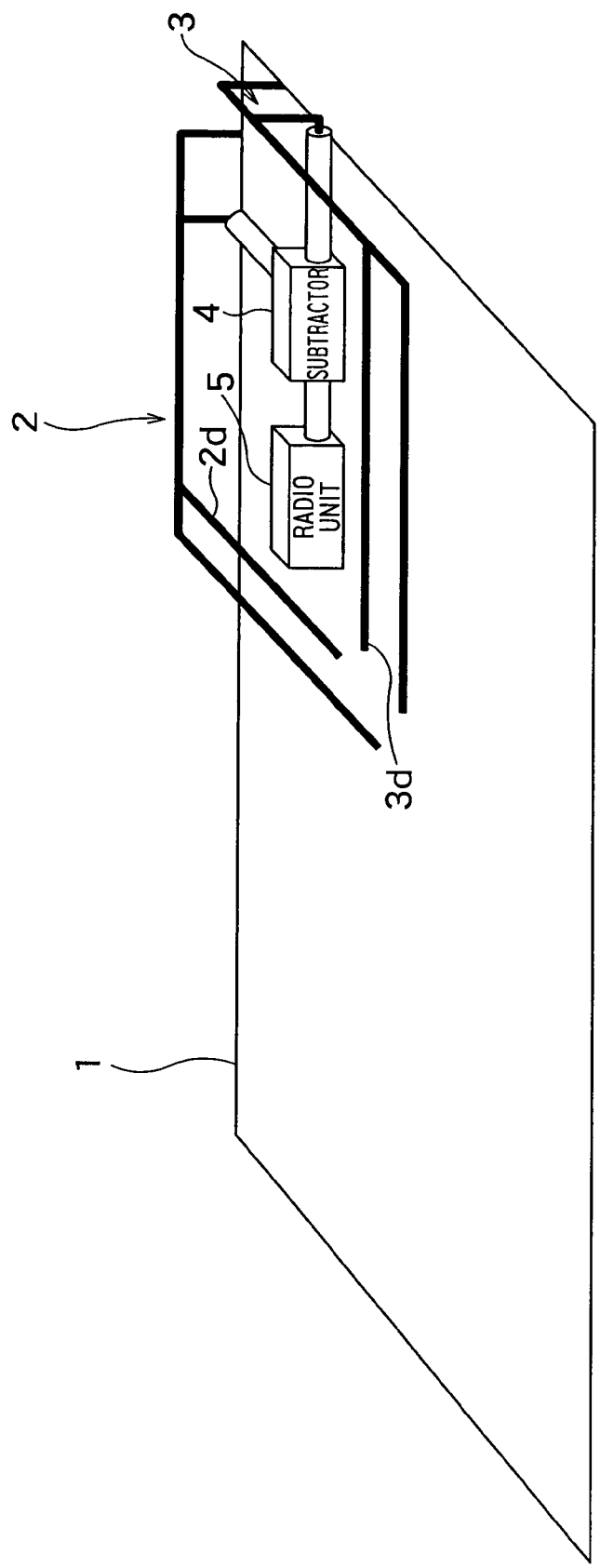
FIG. 15 schematically shows a configuration of an antenna device in which new, linear and conductive elements branch from the antenna elements of the antenna device shown in FIG. 4.

FIG. 15 shows a variation of the antenna device shown in FIG. 4. As shown in FIG. 15, in two antenna elements 2 and 3, new, conductive elements 2d and 3d branch from the side 2a and the side 3a on the way, respectively. That is, on the conductive ground plane 1, one end of the conductive elements 2d and 3d is connected to the side 2a and the side 3a parallel to the conductive ground plane 1, respectively. Consequently, multifrequency can be provided.

Figure 16:
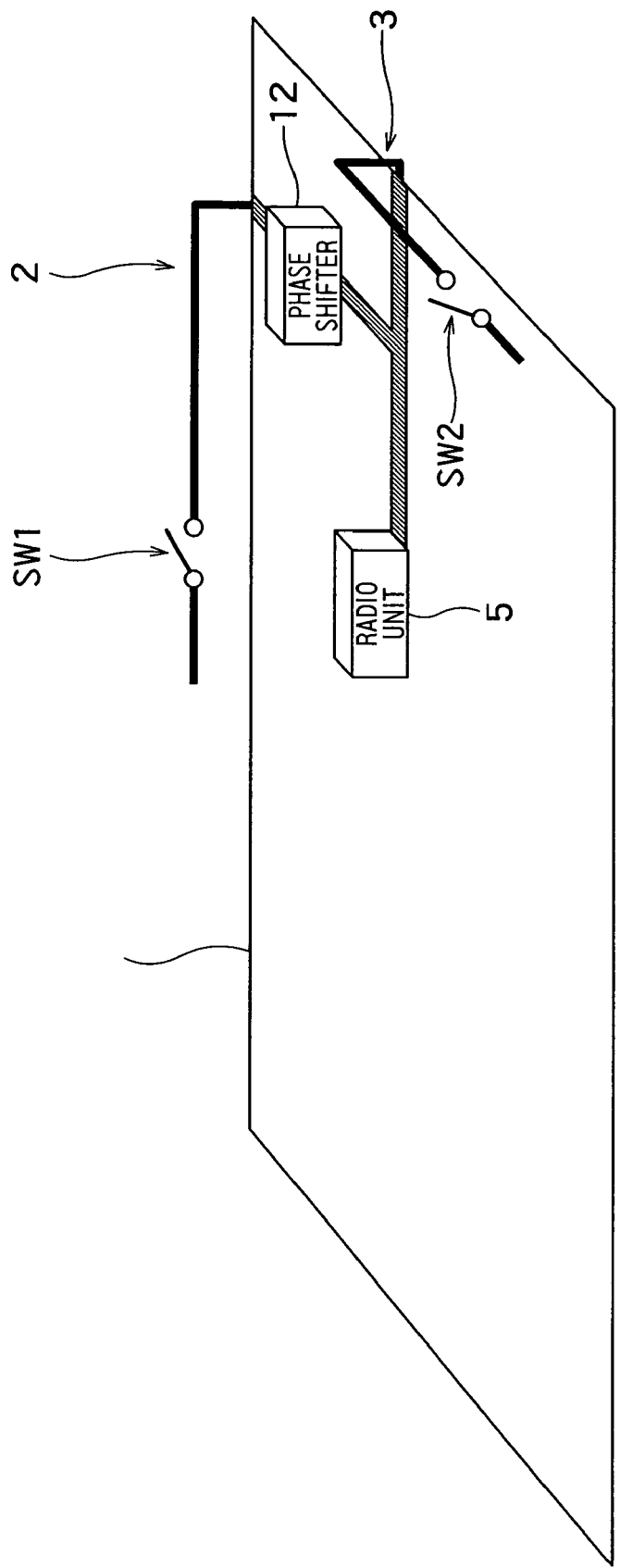
FIG. 16 schematically shows a configuration of an antenna device in which switches are provided in the antenna elements of the antenna device shown in FIG. 7 on the way.

FIG. 16 shows a variation of the antenna device shown in FIG. 9. As shown in FIG. 16, two antenna elements 2 and 3 have switches SW1 and SW2 provided therein on the way, and the switches SW1 and SW2 are switchable between ON and OFF. Accordingly, a length of the antenna elements is switchable, and thereby multifrequency can be provided.

Figure 17:
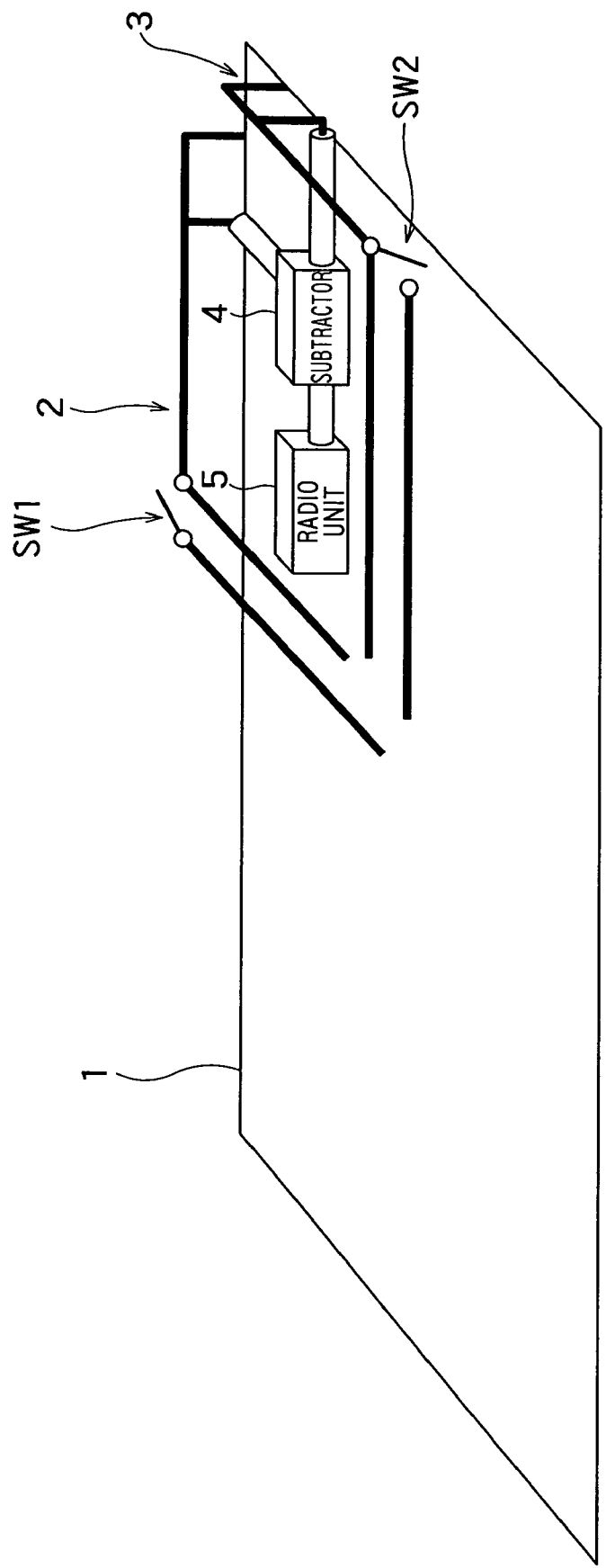
FIG. 17 schematically shows a configuration of an antenna device in which switches are provided in the antenna elements of the antenna device shown in FIG. 15 on the way.

FIG. 17 shows a variation of the antenna device shown in FIG. 15. Similarly to FIG. 16, two antenna elements 2 and 3 have switches SW1 and SW2 provided therein on the way, and the switches SW1 and SW2 are turned on or off, and thereby multifrequency can be provided.

Figure 18:
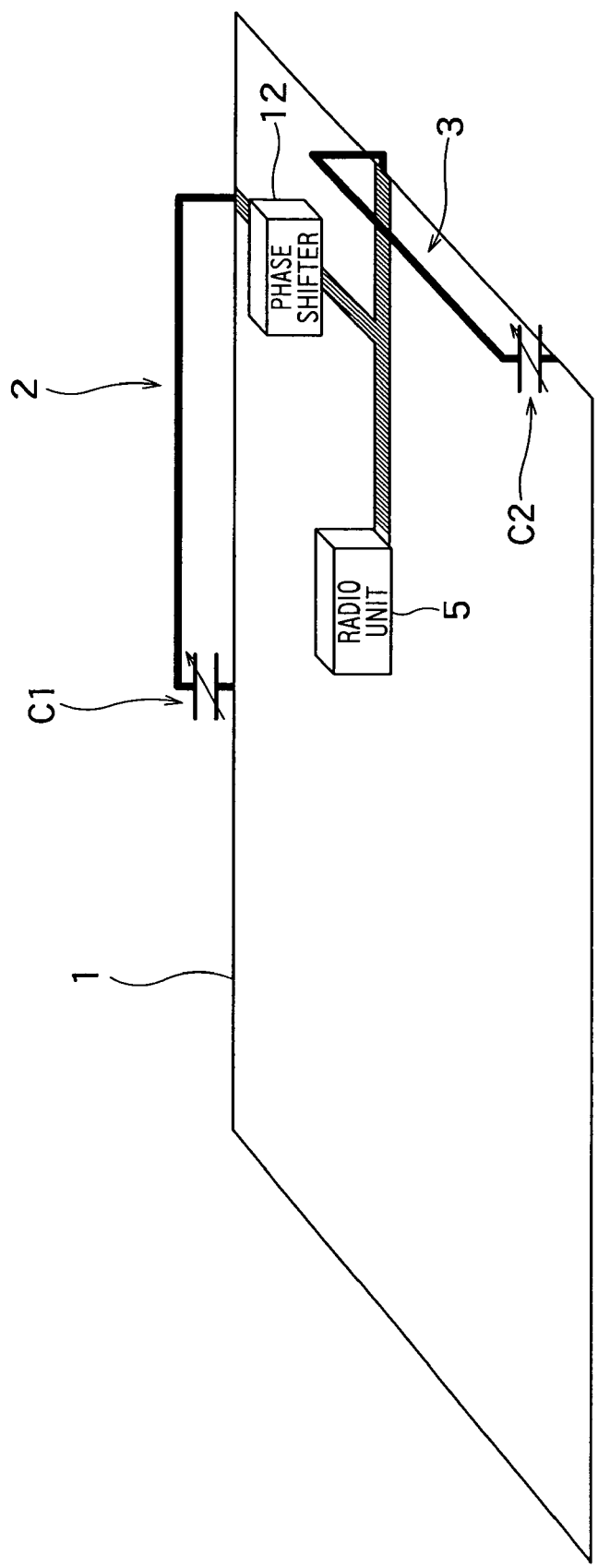
FIG. 18 schematically shows a configuration of an antenna device in which tip ends of the antenna elements of the antenna device shown in FIG. 4 are connected to the conductive ground plane through variable capacitance elements.

FIG. 18 shows a variation of the antenna device shown in FIG. 9. As shown in FIG. 18, variable capacitance elements C1 and C2 are disposed between tip ends of two antenna elements 2 and 3, and the conductive ground plane 1. Switching capacity of the variable capacitance elements C1 and C2 allows an operating frequency of the antenna elements 2 and 3 to be variable. The variable capacitance elements C1 and C2 may be inserted in the antenna elements 2 and 3 on the way, and thereby the similar effect can be provided.

FIG. 19 schematically shows a configuration in which the antenna device according to an embodiment o the present invention is installed in a lower housing of a notebook PC. In such a manner, the present antenna device can be installed in a mobile terminal device such as a notebook PC. An object in which the antenna device according to the present invention is installed is not limited to the mobile terminal device, and can be installed, for example, in a display such as a flat panel display (FPD). In this case, the present antenna device can operate as an antenna for receiving the digital terrestrial broadcasting.

The present invention is not limited to the exact embodiments described above and can be embodied with its components modified in an implementation phase without departing from the scope of the invention. Also, arbitrary combinations of the components disclosed in the above-described embodiments can form various inventions. For example, some of the all components shown in the embodiments may be omitted. Furthermore, components from different embodiments may be combined as appropriate.

What is claimed is:

1. An antenna device, comprising:
a conductive ground plane;
first and second antenna elements connected to the conductive ground plane through first and second feeding points, respectively, directivities of the first and second antenna elements being arranged to be approximately perpendicular to each other;
a phase adjusting circuit configured to provide a phase difference of approximately 180 degrees between first and second signals received by the first and second antenna elements, respectively;
a combining circuit configured to combine the first and second received signals having a phase difference of approximately 180 degrees therebetween to obtain a combined signal; and
a radio unit configured to process the combined signal, wherein
a distance between the first and second feeding points is equal to or smaller than a quarter of an operating wavelength,
each of the first and second antenna elements comprises a first partial element parallel to the conductive ground plane, and a second partial element approximately perpendicular to the conductive ground plane,
each second partial element having a first end connected to a first end of a corresponding one of the first partial elements,
each second partial element having a second end connected to a corresponding one of the first and second feeding points, and
each first partial element is angled so that respective open ends thereof are adjacent to each other.

2. The device according to claim 1, wherein
the first and second feeding points are provided on adjacent edge sides of the conductive ground plane.

3. The device according to claim 1, wherein
the first and second antenna elements have a length of approximately a quarter of an operating wavelength.

4. The device according to claim 1, wherein
the first and second antenna elements have a length of approximately a half of an operating wavelength.

5. The device according to claim 1, wherein
the first and second antenna elements are arranged along adjacent edge sides of the conductive ground plane, respectively.

6. A signal receiving method, comprising:
receiving first and second signals by first and second antenna elements connected to a conductive ground plane through first and second feeding points, respectively, wherein directivities of the first and second antenna elements are arranged to be approximately perpendicular to each other, a distance between the first and second feeding points is equal to or smaller than a quarter of an operating wavelength, each of the first and second antenna elements comprises a first partial element parallel to the conductive ground plane and a second partial element approximately perpendicular to the conductive ground plane, and the first partial elements of the first and second antenna elements are respectively angled such that open ends of the first partial elements of the first and second antenna elements are adjacent to each other;
creating a phase difference of approximately 180 degrees between first and second received signals;
combining the first and second received signals having the phase difference of approximately 180 degrees therebetween to obtain a combined signal; and
processing the combined signal.

7. The device according to claim 1, wherein each first partial element is angled to form first and second element parts substantially perpendicular to each other.

8. The method according to claim 6, wherein each first partial element is angled to form first and second element parts substantially perpendicular to each other.

* * * * *